United States Patent

Moreno

(10) Patent No.: US 7,980,930 B2
(45) Date of Patent: Jul. 19, 2011

(54) ON-LINE GAME BASED ON WORDS, MAKING USE OF A SEARCH ENGINE

(75) Inventor: Roland Moreno, Paris (FR)

(73) Assignee: Innovatron, Paris (FR)

( * ) Notice: Subject to any disclaimer, the term of this patent is extended or adjusted under 35 U.S.C. 154(b) by 871 days.

(21) Appl. No.: 12/003,644

(22) Filed: Dec. 28, 2007

(65) Prior Publication Data
US 2009/0170606 A1    Jul. 2, 2009

(51) Int. Cl.
*A63F 13/12* (2006.01)
*A63F 9/18* (2006.01)

(52) U.S. Cl. .............................. 463/9; 463/42; 273/429

(58) Field of Classification Search .................. 463/9, 28
See application file for complete search history.

(56) References Cited

U.S. PATENT DOCUMENTS

| | | | | |
|---|---|---|---|---|
| 6,328,308 B1 * | 12/2001 | Kirby | ............................. | 273/299 |
| 6,394,899 B1 * | 5/2002 | Walker | ................................ | 463/9 |
| 7,651,095 B1 * | 1/2010 | Pillalamarri et al. | ......... | 273/274 |
| 7,758,048 B1 * | 7/2010 | Crapuchettes et al. | ....... | 273/274 |
| 2007/0072672 A1 * | 3/2007 | Moreno | ........................... | 463/25 |
| 2007/0145686 A1 * | 6/2007 | Wisniewski | ................... | 273/292 |
| 2007/0202937 A1 * | 8/2007 | Peires et al. | ....................... | 463/9 |
| 2008/0113801 A1 * | 5/2008 | Moreno | ........................... | 463/40 |

OTHER PUBLICATIONS

"Google Drinking Game", from Liquor Snob [Online], Oct. 30, 2005, Liquor Snob, 4 pages, [Retrieved from Internet] Retrieved Mar. 15, 2011. <http://www.liquorsnob.com/archives/2005/10/google_drinking_game.php>.*

* cited by examiner

*Primary Examiner* — Dmitry Suhol
*Assistant Examiner* — Carl V Larsen
(74) *Attorney, Agent, or Firm* — Jacobson Holman PLLC

(57) ABSTRACT

A game session of the invention comprises, contained within a very short time lapse, the following successive stages: a) selecting a headword that is communicated to the player; b) for each of the N players, determining a first candidate word presenting semantic proximity with the headword, and transmitting said first candidate word to the gaming site, which submits it to a search engine in combination with the headword in order to receive a numerical score; c) presenting the N first candidate words submitted to the site by the various players and then, for each player, selecting from amongst these N words a second candidate word that, on reflection, the player believes represents that one of the first candidate words that corresponds to the highest score obtained during the first game stage. The final stage comprises calculating, for each player, a performance grade as a function at least of the pertinence of the second candidate word submitted during the second game stage, and classifying the players depending on said performance grades.

17 Claims, 3 Drawing Sheets

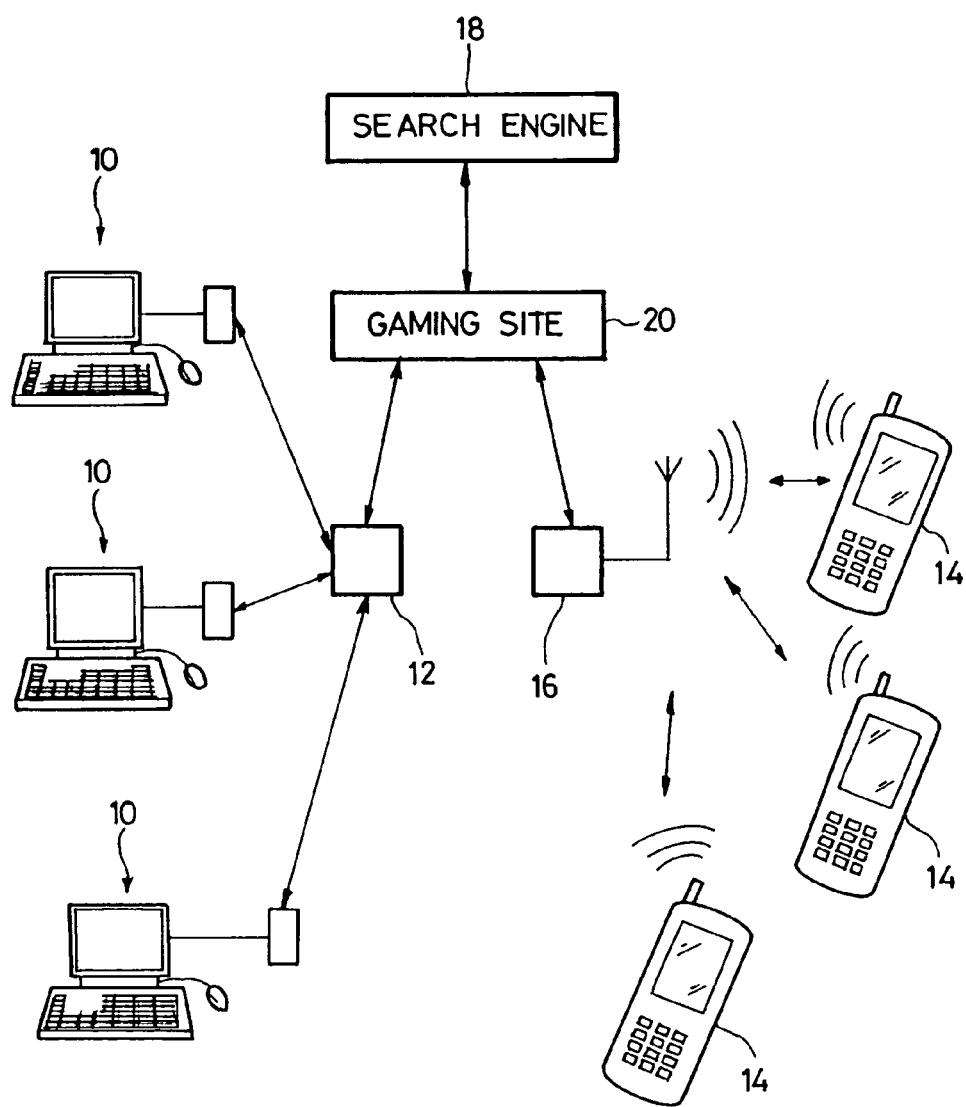

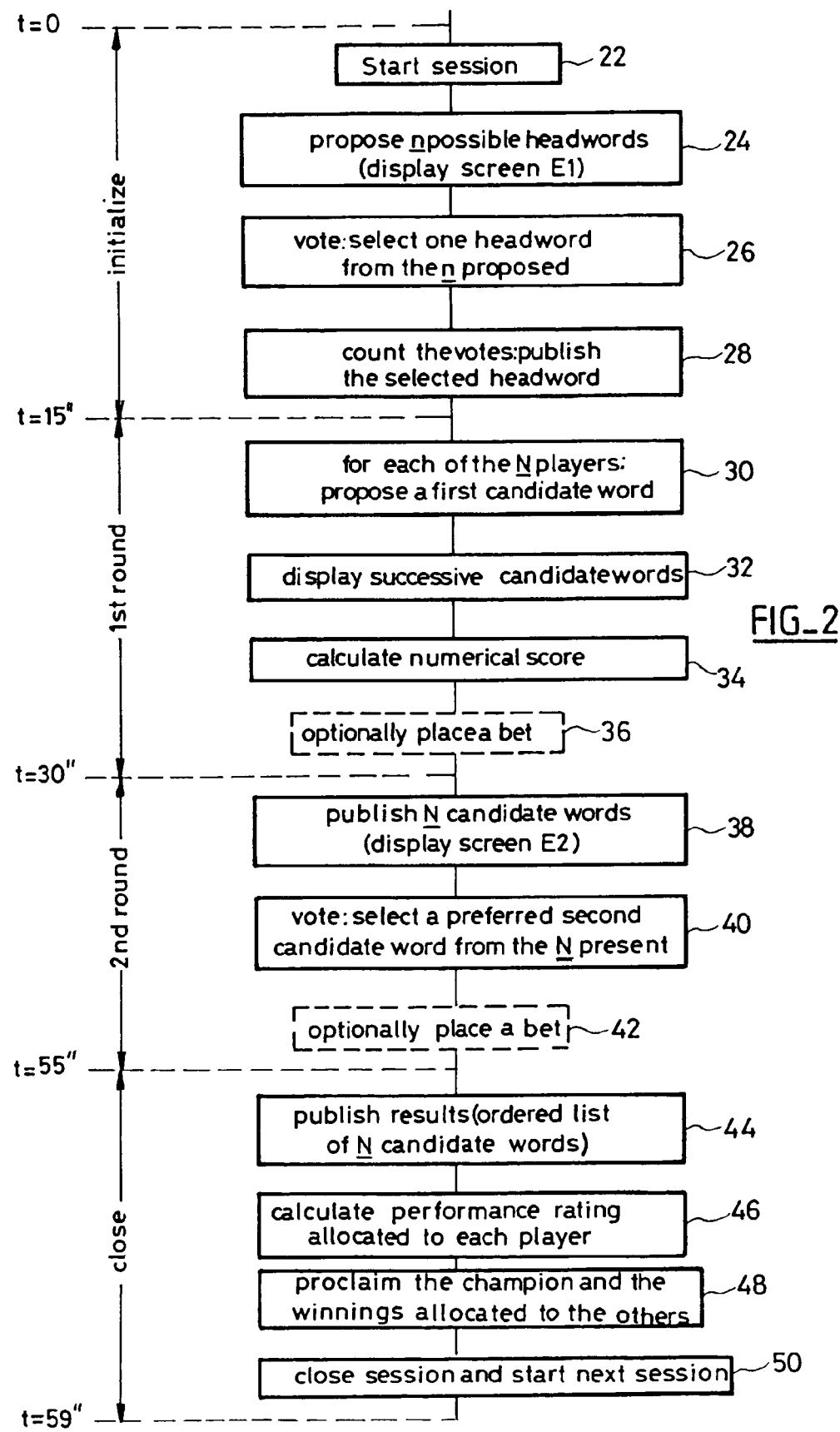
FIG_2

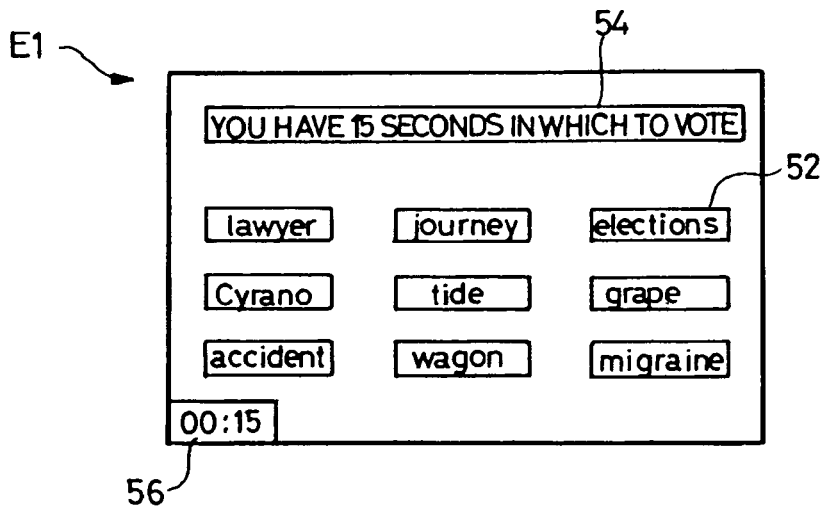
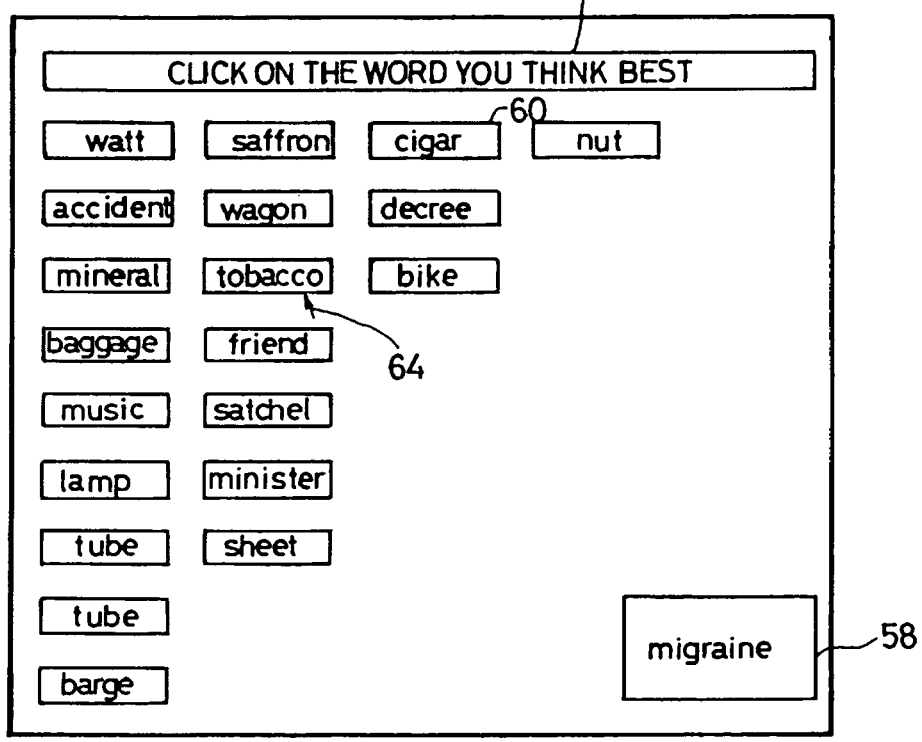

ON-LINE GAME BASED ON WORDS, MAKING USE OF A SEARCH ENGINE

FIELD OF THE INVENTION

The invention relates to a game implemented by computer means in which a plurality of players compete simultaneously during sessions that take place over extremely short time intervals. The players are asked to submit or to select words, and at the end of the session they are ranked by the site, which allocates winning points to them as a function of the pertinence of their replies.

DESCRIPTION OF THE RELATED ART

The recent development of applications associated with using the Internet has popularized the use of search engines such as Google (registered trademark of Google Inc.) or Exalead (registered trademark of Exalead SA) when searching for information, because of the ability of such search engines to index the content of several billion pages that are available for consultation on all kinds of Internet site.

These search engines are used by sending them a request containing a word or a phrase, i.e. a combination or a string of words. The engine responds to such a request in a fraction of a second, supplying a numerical result (referred to below as a "numerical score" or "score") that is representative of the number of occurrences ("hits") of pages containing the word (or the words in the phrase) from amongst the set of stages indexed by the search engine, together with a list of corresponding pertinent Internet sites.

For a phrase that combines two (or more) words, the numerical score depends on the greater or lesser semantic proximity between the words submitted in combination to the engine. It should be observed that in any event, a request on two words {X Y} necessarily gives a score that is lower than a request on one word {X} or on one word {Y}, regardless of X and Y.

The use of such search engines, which as become an everyday activity, has revived interest in games based on word searches.

By way of example, one such on-line game is disclosed in copending application U.S. Ser. No. 11/598,229 dated Nov. 13, 2006 (Computer-implemented game based on combinations of words) in the name of Moreno, the disclosure of which is incorporated by reference. That application describes an on-line game calling on a player's knowledge and shrewdness. More precisely, starting from an initial word submitted by the site, the player seeks to find a series of additional words which, when combined with the initial word, maximize the number of occurrences of the combination of words when submitted to a search engine.

A characteristic of that game is its individual nature, i.e. each player is playing essentially "against the site", and not against other players, nor is there any competition with other players, even though a plurality of players are naturally connected simultaneously to the site. Thus, a given player does not known the responses given by the other players, and does not need to know those responses, since they are not of a nature to contribute significantly to the way in which the player will respond to the questions posed by the gaming site.

SUMMARY OF THE INVENTION

One of the objects of the invention is to propose a game based on word proposals formulated by players, which game draws on the speed and the power of one or more search engines, and does so in association with rules that make the game entirely deterministic (not random) and collective (a competition between a plurality of players), while maintaining a highly sustained rhythm, the game of the invention being characterized by the shortness of its sessions.

That said, and as explained below, the game of the invention is not a game of knowledge or erudition, i.e. it is accessible to a very large number of people, insofar as it consists merely in the player seeking entertainment and hoping for winnings, and not in testing a player's general or other knowledge.

To achieve the above-mentioned aims, the invention provides an on-line game implemented by means of a computer system comprising a gaming site, a population of N players, a plurality of terminals available to respective players, each terminal being coupled to the gaming site to transmit to the site data input by the respective players and to receive from the site data in return, and a search engine coupled to the gaming site. The site is suitable for submitting requests to the search engine, each request containing a pair of words or of groups of words, and for receiving in return a numerical score that is determined by the search engine, the numerical score being representative of the occurrences of the pair of words or of groups of words in a set of web pages that are indexed by the search engine.

The game of the invention comprises at least one game session comprising the following successive stages:

a) an initial stage comprising selecting a headword and communicating the selected headword to the players;

b) a first stage of the game, comprising for each of the N players:
  the player determining a first candidate word presenting semantic proximity with the headword, and transmitting this first candidate word to the gaming site; and
  the gaming site submitting to the search engine a request containing the pair of words formed by the headword and the first candidate word, and receiving in return the corresponding numerical score;

c) a second game stage comprising:
  presenting to the players the N first candidate words submitted to the site by the various players during the first game stage; and
  each player selecting amongst these N candidate words a second candidate word representing that one of the first candidate words which, on reflection, the player believes corresponds to the highest score obtained during the first stage of the game; and d) a final stage comprising the gaming site:
  calculating for each player a performance grade that is a function at least of the pertinence of the second candidate word submitted during the second game stage; and
  classifying the players depending on their said performance grade.

The successive stages of a session are preferably contained within a short time lapse of determined duration, e.g. one minute, the successive stages of a session running on one from another without any intermediate pauses. A plurality of sessions may be run on one from another without any intermediate pauses.

According to various preferred implementation characteristics of the game of the invention:

the initial stage begins with submitting to the players a plurality of possible headwords, with said selection of a headword being a selection by the players voting for words amongst said plurality of headwords; this stage may also provide for selecting a limited number of players, with the N selected players being the players who were the first to vote;

during the first game stage, a first candidate word submitted by a player is refused by the site if that candidate word has already been submitted by another player;

the first game stage further comprises displaying to each of the players all of the candidate words previously submitted by the other players, progressively as they are submitted;

the first game stage further comprises the player deciding to bet a stake of a kind that will increase or decrease the performance grade calculated during the final stage;

the second game stage further comprises the player deciding to bet a stake of a kind that will increase or decrease the performance grade calculated during the final stage;

the second game stage further comprises presenting to all of the players an order list of all of the candidate words submitted during the first game stage by the N players, and classified depending on their respective numerical scores;

during the final stage, the performance grade calculated for a given player is also a function of the score obtained by the first candidate word submitted by that given player during the first game stage, and/or the number of other players for whom the first candidate word obtained scores lower than that of said given player, and/or the number of other players for whom the second candidate word matched the first candidate word submitted by the said given player;

the final stage further includes designating a champion player amongst the players for whom the second candidate word matches the headword, these players themselves being ranked as a function of their respective performance grades; and the game comprises, after the end of the first session, launching a new session with as its new headword the group of words formed by the headword of the first session in combination with the candidate word that obtained the highest numerical score during the first session.

BRIEF DESCRIPTION OF THE DRAWINGS

There follows a description in greater detail of an implementation of the invention, given with reference to the accompanying drawings.

FIG. 1 shows an example of a computer system usable in the context of the game of the invention, showing the various functional blocks involved in implementing it.

FIG. 2 is a flow chart showing in detail the various successive steps of the game of the invention.

FIGS. 3 and 4 show examples of how information is displayed to the player during the two main stages of the game.

DETAILED DESCRIPTION OF A PREFERRED IMPLEMENTATION

FIG. 1 shows a computer system enabling the invention to be implemented.

The invention can advantageously be implemented by means of an Internet site to which the player connects by means of a computer, however this mode is not limiting in any way, it being possible to implement the invention otherwise, providing there exist means for engaging in an interactive both-way exchange of data between the player and a remote site, i.e. the gaming site organizing the running of the various steps of the method of the invention.

In particular, the invention can be implemented by means of mobile telephones or personal digital assistants capable of exchanging data with the gaming site via a cellular network, using various well-known technologies such as SMS, WAP, GPRS, UMTS-3G, etc.

The users of such networks can thus while away idle moments (on public transport, in waiting rooms, etc.) by playing the game of the invention, with the hope of winning prizes.

In FIG. 1, reference 10 designates microcomputers used by players. Each microcomputer 10 is connected to a telecommunications network which, in this example, is a wired terrestrial network such as the telephone network (in switched mode or in DSL mode), a cable TV network, or indeed a connection to the Internet via a common server having a plurality of stations.

The game can also be implemented using cell phones 14 having functions that enable them to exchange digital data via various well-known technologies such as SMS, WAP, GPRS, or UMTS-3G.

The computer or telephone terminals 10, 14 are connected via appropriate respective interfaces 12, 16 to a gaming site 20 suitable for exchanging digital data with the terminals. Users begin by initially identifying themselves with the gaming site 20 using a protocol that is itself conventional, comprising inputting a specific address or telephone number, as appropriate, and then sending a subscriber identifier or number (login) and a password.

Each of the terminals can display text messages on a screen, in particular information received from the gaming site 20, with it being possible for the user to input alphanumeric data via a keyboard or keypad and to send such data in return to the gaming site 20.

In this respect, the gaming site 20 acts, in combination with the interfaces 12 and 16, to format messages as a function of the type of terminal in use: computer or telephone. Thus, for computer terminals 10, messages are formatted so as to be capable of being received and displayed in the form of web pages readable using a browser, while for mobile telephones, messages are formatted for example as WAP pages, that are better suited to being displayed on a screen of small size. Nevertheless, it should be observed that the content of messages formatted by the gaming site 20 and the interfaces 12 and 16, i.e. the information they actually exchange with the various terminals, is identical regardless of the formatting, with the only changes relating to the layout with which the information is to be displayed by computer terminals or telephone terminals. The various formats mentioned above for presenting information are not limiting and the same basic information could be presented to players in different formats, going from the very small (mobile telephone screen) to the very large (display on a giant screen, e.g. in a TV studio); the difference lies only in the way in which the various items of information sent to the player are presented, this presentation being adapted to the presentation media used.

In addition to being coupled to the various terminals used by the players, the gaming site 20 is also coupled to at least one search engine 18, to which requests formulated by the players can be submitted, and from which there can be received in response a numerical result representative of the number of occurrences ("hits") of pages that contain the word or words contained in the request, from amongst the set of pages that are indexed by the engine. The gaming site 20 may optionally be coupled to a plurality of search engines, in which case it will deliver to the player a response that is a combination of the results obtained from the various engines: an arithmetic mean of the number of hits, the maximum or minimum number of hits, etc.

There follows a description of the manner in which the game of the invention takes place in a preferred example.

As in above-mentioned U.S. Ser. No. 11/598,229, the disclosure of which is incorporated by reference, the game of the invention makes use of the property of search engines whereby they provide not only references to all of the pages containing a given word, but they also provide other information (referred to herein as the "score"), itself a very large value, namely the number of pages in which there appear the word, or two (or more) words as united in a phrase in a single request.

The present invention makes use of the game idea set out in above-mentioned U.S. Ser. No. 11/598,229, which idea consists, after selecting a first word (referred to below a the "headword"), in finding another word (referred to below as the "candidate word") that produces the highest possible score.

The headword and the candidate word are selected from the same semantic field. The gaming site implements various techniques for this purpose to prevent the game being biased by selecting as the additional word a term of little significance, such as an article or an adverb, which would necessarily give a high score. Thus, prior to delivering a score for the phrase combining the headword and the candidate word, the gaming site may, for example check the score of the candidate word considered in isolation, and refuse the candidate word if, on its own, it presents a score that is greater than that of the headword, or a score that is greater than a given threshold, the threshold itself being a function of a score for the headword.

There follows a detailed description of the various steps of the game of the invention, with reference to FIGS. 2 to 4.

Most advantageously, each session of the game takes place over a time interval that is very short, e.g. an interval of 60 seconds, so as to give the game a highly sustained rhythm, which is particularly motivating for players.

The session begins at an instant t=0 (step 22), with an initial stage having a duration of about 15 seconds.

This stage consists in presenting a screen E1 of the kind shown in FIG. 3, identically to all of the players. This screen displays a plurality of words, e.g. nine words presented in clickable fields 52, together with a message 54 "YOU HAVE 15 SECONDS IN WHICH TO VOTE" indicating the action that is to be performed, and a timer 56 counting down the time remaining for taking the action.

Once this screen E1 has been presented to the players (step 24), each player selects from amongst the n=9 words proposed, a headword that the player finds the most inspiring (step 26).

At this stage, it is possible to invoke a numerus clausus limiting the number of players participating. Thus, for example, only the N=100 first voters are kept as players for participating in the session. This characteristic makes it possible to further increase the rhythm of the game, since once the screen E1 has been displayed, the players must vote quickly if they want to be kept on to participate in the session.

The final step of the initial stage (step 28) is a step of counting the votes and publishing the selected headword, i.e. the word that has received the largest number of votes amongst the N players. For example, the word "migraine".

At this instant (T=15 seconds) the first stage of the game proper begins, having a duration of 15 seconds.

The screens E1 are deleted and all that remains on display is the selected headword ("migraine") in very large letters.

Each player thus has 15 seconds for proposing the candidate word that, when associated with the headword "migraine", will, in the player's opinion, produce the highest numerical score (step 30). Immediately after being keyed in and confirmed by the player, this word, referred to below was the "first candidate word", is displayed on the screens of all N=100 players (step 32) and takes priority over the other players, i.e. the (N−1)=99 other players cannot propose this word during the same session. The successive candidate words displayed and made visible to the all of the players, are thus all different.

Furthermore, the gaming site uses the search engine to determine the numerical score for each of the first candidate words (step 34), producing a respective score S to the benefit of each player.

Optionally, it is possible to give each player the option of placing a stake on the first candidate word the player has submitted (step 36).

To do this, the player keys in the sum, if any, being staked on the word, with "250" meaning 'I bet 250 points on "cigar-migraine"' (if the player proposed the word "cigar" as the first candidate word). This stake or "joker" serves to increase or decrease the winnings finally allocated to the player at the end of the game when calculating the player's performance index (see below). In other words, if the player is of the opinion that the chances of the response given are very good, then the player can choose to increase the final winnings by these 250 points—but conversely, if the response is not pertinent, the final winnings will be reduced as much.

The first round is closed at the end of the 15 seconds of the first stage of the game, i.e. at t=30 seconds, and the game continues immediately with the second stage of the game proper, consisting in a second round of voting, having a duration of 25 seconds.

From amongst the N=100 candidate words that have been submitted during the first stage of the game, each player now has to vote for the candidate word that, on reflection, appears to the player to be the most likely to produce the highest numerical score. This word for which the player is going to vote, referred to below as the "second candidate word", is usually (but not necessarily) a word that is different from the first candidate word as originally proposed by the player, whenever a player is of the opinion that some other player has proposed a word that is more pertinent.

This stage is implemented by presenting (step 38), identically to all of the players, a screen E2 as shown in FIG. 4, with the headword "migraine" in a fixed field 58, in association with the N=100 first candidate words as submitted by the various players, each displayed in a clickable field 60. A field 62 states the action to be taken by the player to whom the screen E2 is presented, i.e. "CLICK ON THE WORD YOU THINK BEST". Each player can vote by clicking on one of the fields 60, as represented at 64 in FIG. 4 (step 40).

As with the first round, it is likewise possible to give the player the chance to place a bet on this word, if so desired (step 42): the player then keys in the amount being staked, e.g. "500" means 'I bet 500 points on "tobacco-migraine"' (if the player believes, in the end, that it is "tobacco", in combination with "migraine" will give the highest score).

At t=55 seconds, after receiving the N=100 votes, the gaming site closes the second round and published the final result for the session.

This final stage comprises firstly (step 44) publishing the list of the N=100 candidate words displayed in decreasing score order from rank 1—corresponding to the highest score S—to rank 100—corresponding to the lowest score S.

A performance grade is calculated for each player (step 46), and on the basis of the relative grades for the various players, the site proceeds to proclaim: i) the champion player; ii) the number of points received by the champion; and iii) the winnings allocated to the other players (step 48).

More precisely, the champion player is for example, the player who:

voted correctly, i.e. voted for the second candidate word that is indeed the word that obtains the highest score; and gave a candidate word that produced the best performance, in order to act as a tiebreaker.

Performance can be evaluated in particular as a function of parameters C and/or V:

C is the number of players during the first round proposing first candidate words giving a score lower than the score of the player in question (in other words, C is the number of players with poorer classifications in the first round than the player whose performance is being graded); and V is the number of players whose second candidate word matched the first candidate word submitted by the player in question (in other words V is the number of players who, in the second round, voted for the word that was proposed in the first round as the candidate word by the player whose performance is being determined).

Once the champion player has been determined on the above basis, the site allocates a large number of points to that player, e.g. 1000 points.

The other 99 players win varying numbers of points, e.g. (C+V) points thus enabling them to be classified as a function of the pertinence of the responses given by each of them.

At the end of this step, the session is closed t=59 seconds.

A new session can then be begun immediately.

This new session can be engaged on a new series of headwords proposed by the site to the players.

In a variant, the new session can be engaged with a new headword that is not constituted by a new single word, but by the group of words (e.g. "tobacco-migraine") constituted by the headword of the first session in combination with the candidate word that obtained the highest score during that first session. The new session then consists in finding a new word that provides the highest score with the pair "tobacco-migraine".

The points allocated to the player may be transferred into winnings of a very wide variety of kinds, or into monetary sums by crediting an account such as an account of the Google Checkout or PayPal (registered trademarks) type which are amongst the best known payment sites, and which are very suitable for "micropayments", i.e. payments of sums, even when they are very modest, a few dollars or even less than one dollar. The game of the invention can also be used for inciting players to open an account with such an on-line payment site, as described in particular in copending application U.S. Ser. No. 11/898,472 dated Sep. 12, 2007 (A method of developing the activity of an on-line payment site by means of an attractor site interfaced therewith), in the name of Moreno, with the disclosure thereof being incorporated by reference.

The invention claimed is:

1. An on-line game implemented by means of a computer system comprising:

a gaming site; accessible by N players;

a plurality of terminals available to respective players, each terminal being coupled to the gaming site to transmit to the site data input by the respective players, and to receive from the site data in return; and a search engine coupled to the gaming site, the site being suitable for submitting requests to the search engine, each request containing a pair of words or of groups of words, and for receiving in return a numerical score that is determined by the search engine, the numerical score being representative of the number of hits for the pair of words or of groups of words in a set of pages that are indexed by the search engine; the game comprising at least one game session, itself comprising the following successive stages:

a) an initial stage comprising selecting a headword and communicating the selected headword to the players;

b) a first stage of the game, comprising for each of the N players:

the player determining a first candidate word presenting semantic proximity with the headword, and transmitting this first candidate word to the gaming site; and the gaming site submitting to the search engine a request containing the pair of words formed by the headword and the first candidate word, and receiving in return the corresponding numerical score;

c) a second game stage comprising:

presenting to the players the N first candidate words submitted to the site by the various players during the first game stage; and each player selecting amongst these N candidate words a second candidate word representing that one of the first candidate words which, on reflection, the player believes corresponds to the highest score obtained during the first stage of the game; and d) a final stage comprising the gaming site:

calculating for each player a performance grade that is a function at least of the pertinence of the second candidate word submitted during the second game stage; and classifying the players depending on their said performance grade.

2. The on-line game of claim 1, in which each of said successive stages of a session is contained within a short lapse of time of predetermined duration.

3. The on-line game of claim 2, in which said successive stages of a session run on from one to another without any intermediate pause time.

4. The on-line game of claim 2, in which the total duration of a session is one minute.

5. The on-line game of claim 2, comprising a plurality of successive sessions running on one after another without any intermediate pause times.

6. The on-line game of claim 1, in which the initial stage begins with submitting to the players a plurality of possible headwords, with said selection of a headword being a selection by the players voting for words amongst said plurality of headwords.

7. The on-line game of claim 6, in which the initial stage also comprises selecting a limited number of players, the N selected players being the players who were the first to vote.

8. The on-line game of claim 1, in which during the first game stage, a first candidate word submitted by a player is refused by the site if that candidate word has already been submitted by another player.

9. The on-line game of claim 1, in which the first game stage further comprises displaying to each of the players all of the candidate words previously submitted by the other players, progressively as they are submitted.

10. The on-line game of claim 1, in which the first game stage further comprises the player deciding to bet a stake of a kind that will increase or decrease the performance grade calculated during the final stage.

11. The on-line game of claim 1, in which the second game stage further comprises the player deciding to bet a stake of a kind that will increase or decrease the performance grade calculated during the final stage.

12. The on-line game of claim 1, in which the second game stage further comprises presenting to all of the players an order list of all of the candidate words submitted during the first game stage by the N players, and classified depending on their respective numerical scores.

13. The on-line game of claim 1, in which, during the final stage, the performance grade calculated for a given player is also a function of the score obtained by the first candidate word submitted by said given player during the first game stage.

14. The on-line game of claim 1, in which, during the final stage, the performance grade calculated for a given player is also a function of the number of other players for whom the first candidate word obtained a score lower than that of said given player.

15. The on-line game of claim 1, in which, during the final stage, the performance grade calculated for a given player is also a function of the number of other players for whom the second candidate word matched the first candidate word submitted by said given player.

16. The on-line game of claim 1, in which the final stage further includes designating a champion player amongst the players for whom the second candidate word matches the headword, these players themselves being ranked as a function of their respective performance grades.

17. The on-line game of claim 1, including, after the end of the first session, launching a new session with as its new headword the group of words formed by the headword of the first session in combination with the candidate word that obtained the highest numerical score during the first session.

* * * * *